Inventor.
William J. Burger.
by
Thurston Kwis + Hudson
attys.

March 15, 1927. 1,620,868
W. J. BURGER
CROSS SLIDE CARRIAGE FOR TURNING AND FACING BLANKS
Filed April 7, 1922    6 Sheets-Sheet 3
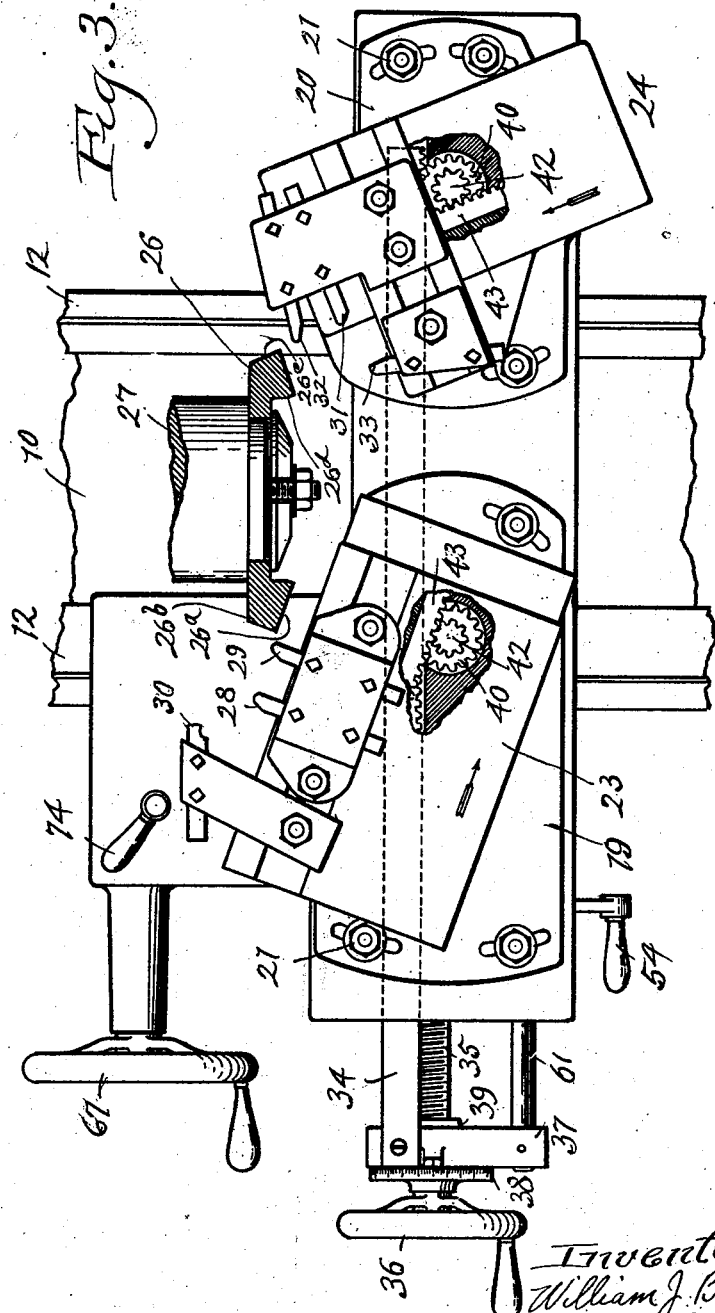

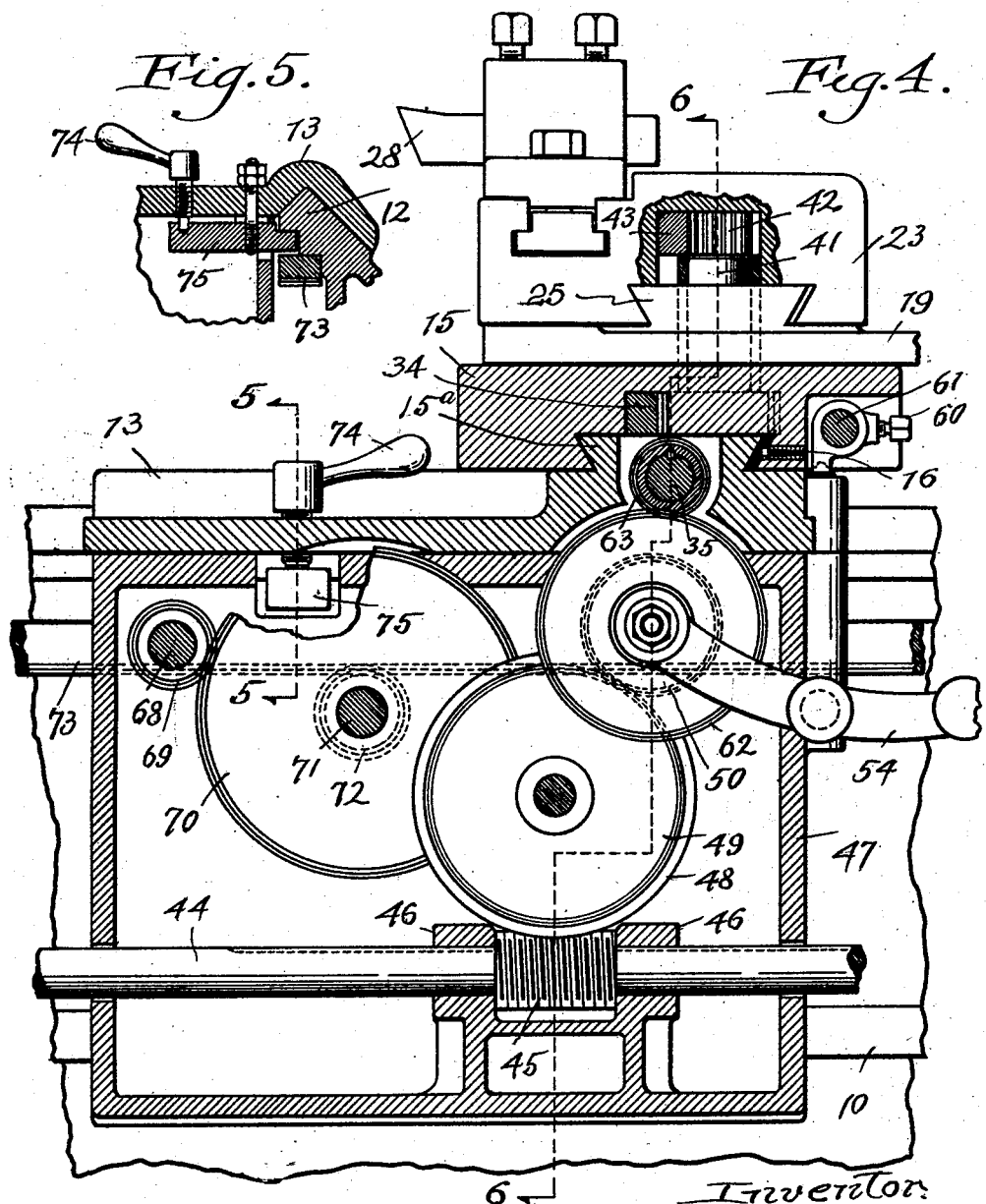

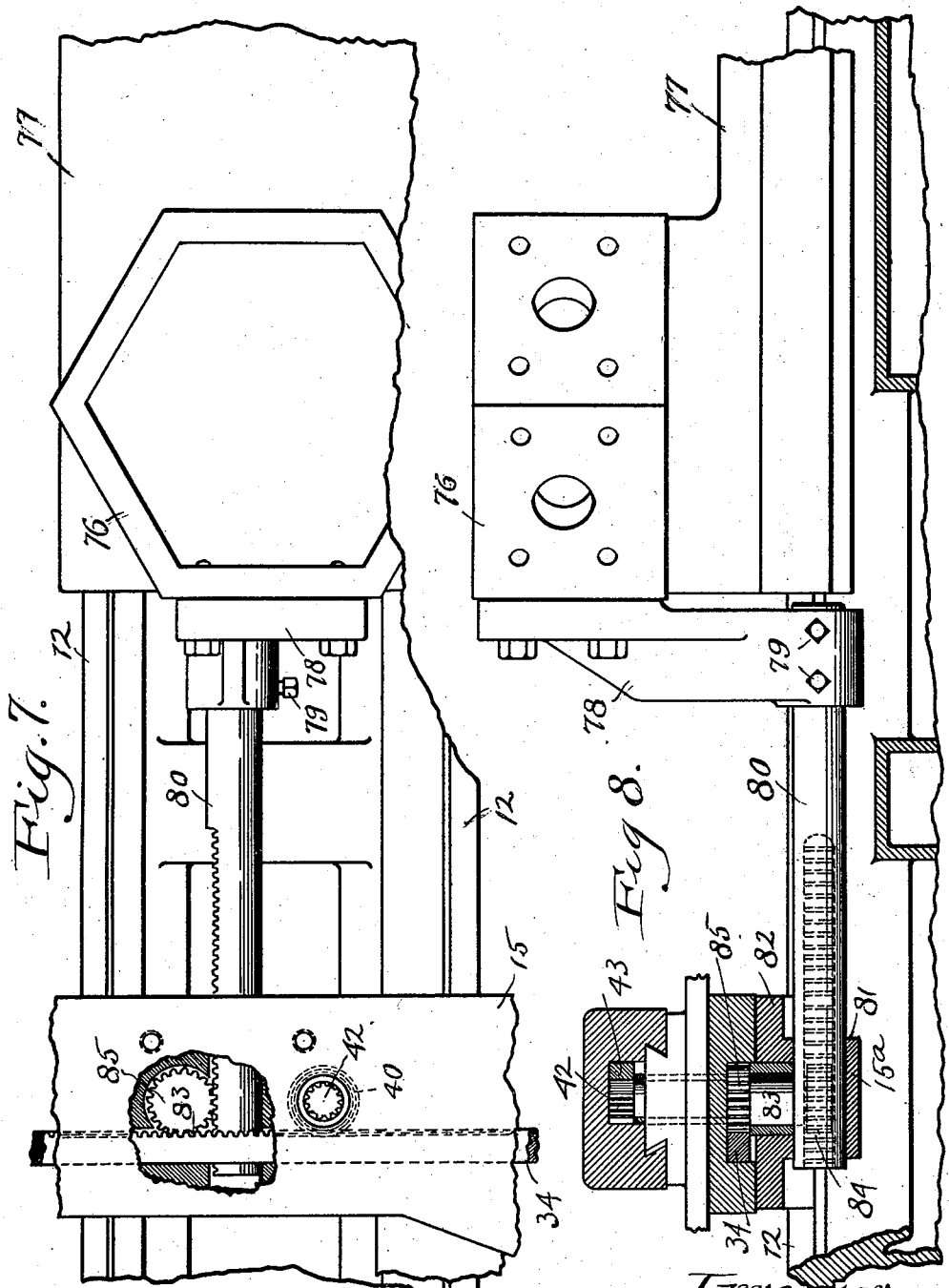

Patented Mar. 15, 1927.

1,620,868

UNITED STATES PATENT OFFICE.

WILLIAM J. BURGER, OF EAST CLEVELAND, OHIO, ASSIGNOR TO THE WARNER AND SWASEY COMPANY, OF CLEVELAND, OHIO, A CORPORATION OF OHIO.

CROSS-SLIDE CARRIAGE FOR TURNING AND FACING BLANKS.

Application filed April 7, 1922. Serial No. 550,256.

This invention relates to an improved cross slide carriage for turning and facing bevel gear and other blanks.

The principal object of the present invention is to provide a turning and facing machine wherein the greatest possible efficiency is obtained in turning and facing bevel gear blanks and the like by the provision on a machine of the lathe type of an improved cross slide carriage having compounded tool slides adapted to be provided with tools for turning and facing blanks of the type above stated, together with means for simultaneously operating both slides so as to do the work for which the machine is designed efficiently and accurately, with the tools traveling in the correct angular directions and with minimum idle movements.

A further object is to obtain the above results with my invention embodied in the form of an attachment which can be applied in a very effective manner to a standard machine such as a turret lathe or engine lathe so as to transform the machine temporarily into a very efficient turning and facing machine for turning and facing bevel gear blanks and the like.

A further object of my invention is to provide means whereby this above stated transformation of a standard machine may be made in a very simplified way by removing only a few parts of the standard machine and by sliding the attachment into place with the requirement of but little time.

A further object is to attain the desired results with a cross slide carriage having a plurality of tool slides which are moved in their individual paths which may be adjusted at will, from a unitary point or by a common member serving to cause the slides to move simultaneously in the desired manner, whereby the results are obtained with efficient but greatly simplified mechanism.

A further object is to carry out the results desired with an attachment which can be readily applied to a standard carriage of the lathe, and to provide certain mechanism for moving the slides, capable of being operated by the mechanism of a standard lathe, either from the usual cross slide operating mechanism or from the usual turret operating mechanism as may be desired.

The invention may be briefly summarized as consisting in certain novel combinations and arrangements of parts which will be described in the specification and set forth in the appended claims.

Figure 1:
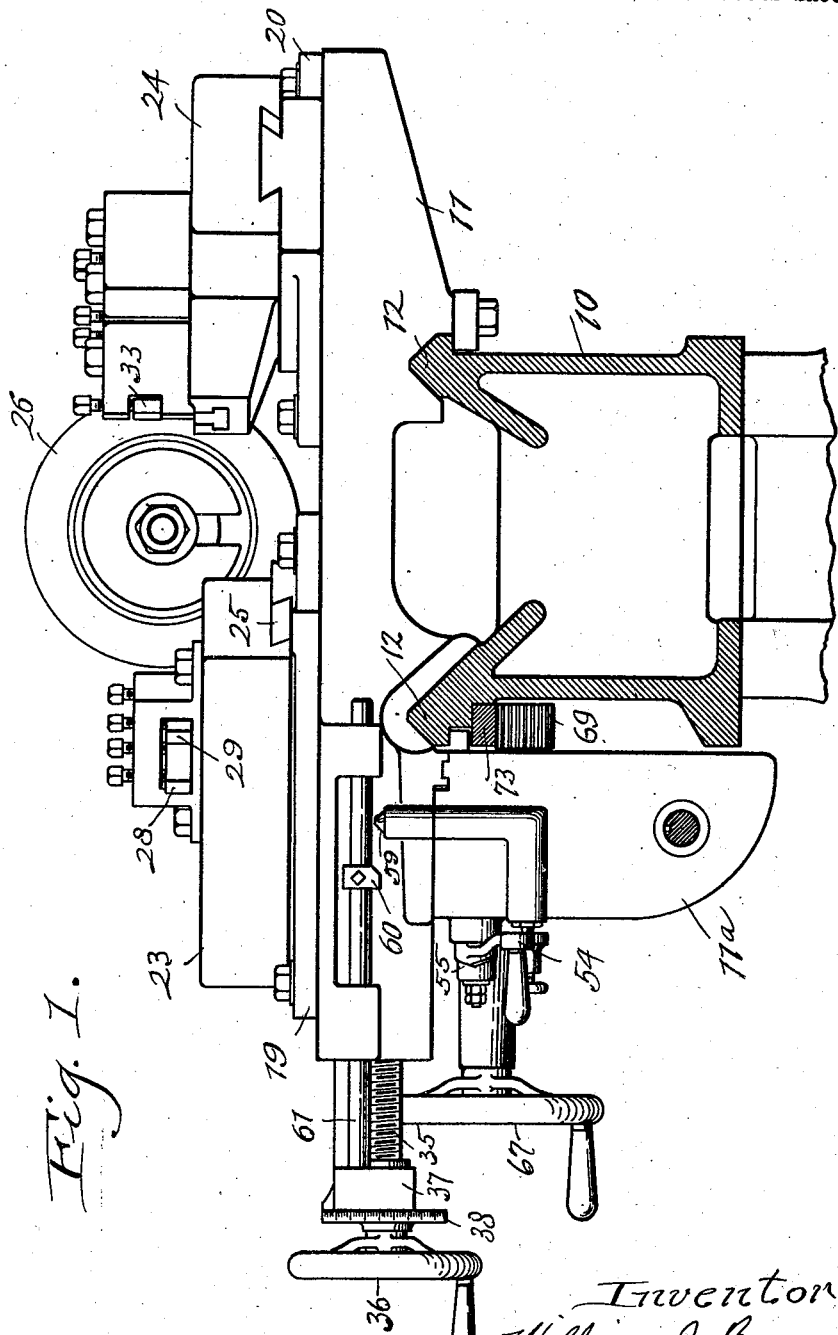
Figure 2:
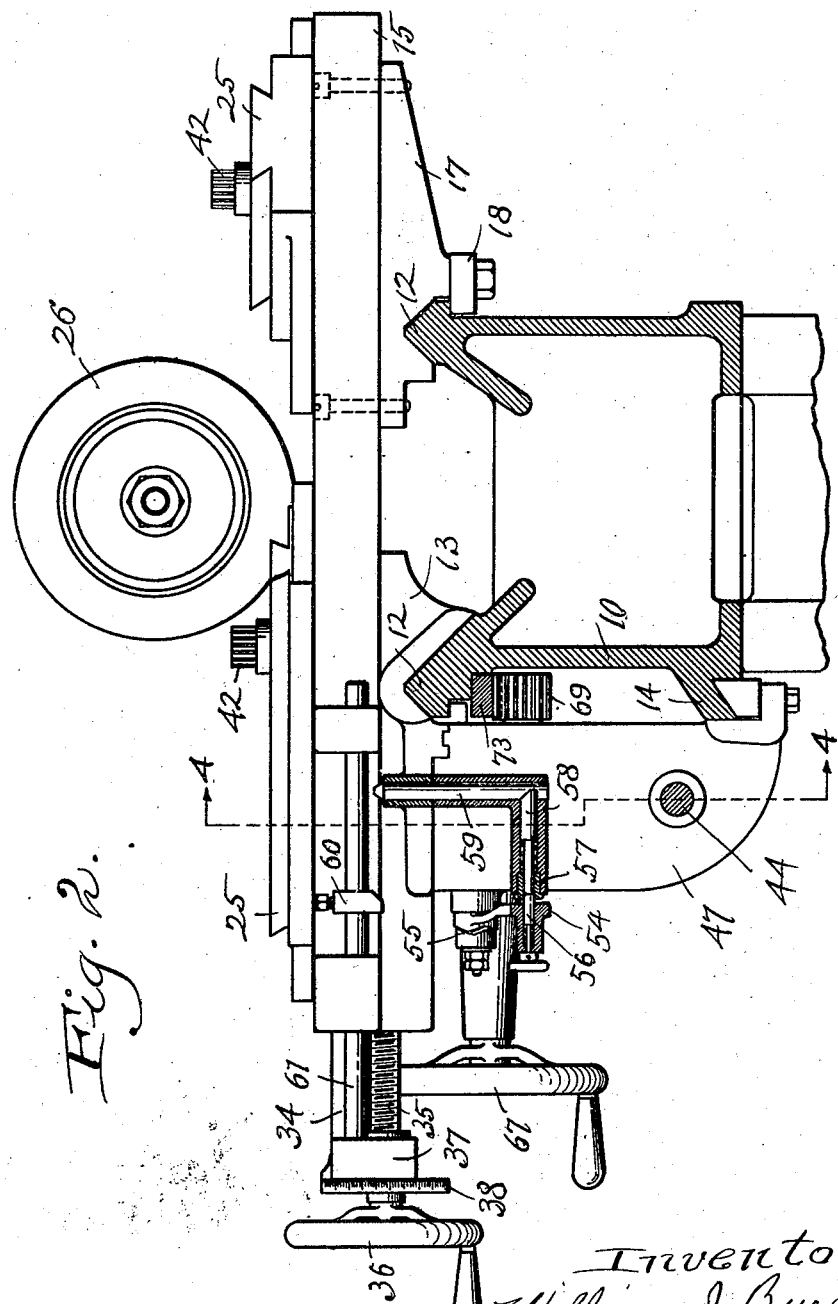
Figure 6:
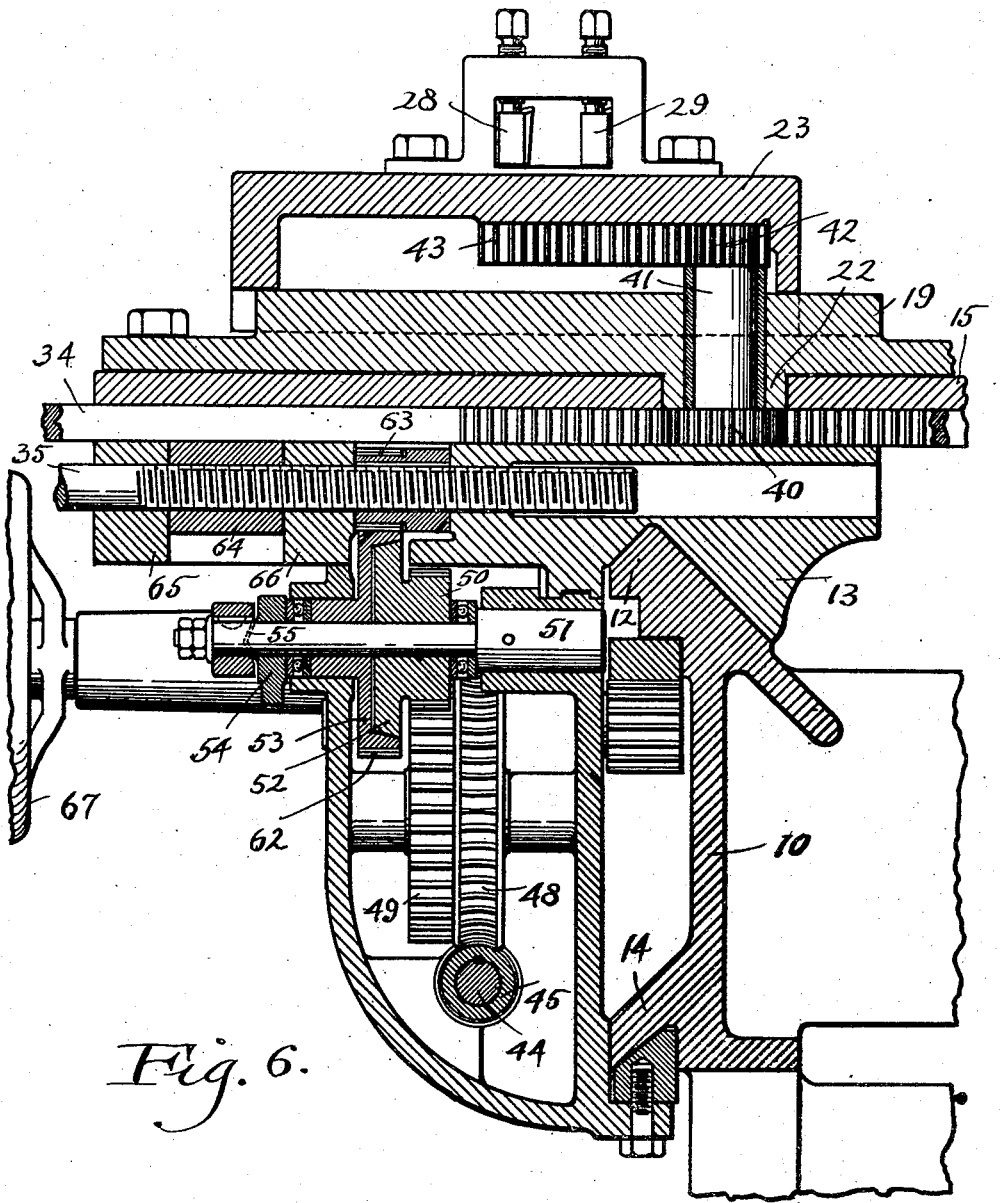

In the accompanying sheets of drawings wherein I have shown certain embodiments of the invention, Fig. 1 is a transverse sectional view through the bed of a lathe showing in elevation my improved cross slide carriage, this view illustrating a machine which is designed primarily as a machine for turning and facing bevel gear blanks or blanks of similar nature; Fig. 2 is a similar view with the slides omitted, showing my invention in that embodiment thereof wherein it is in the form of an attachment to the cross slide carriage of a standard lathe; Fig. 3 is a top plan view with parts in section and parts broken away, showing the improved carriage irrespective of whether the invention is applied as an attachment as in Fig. 2, or constitutes a part of a machine designed solely for the purpose stated; Fig. 4 is a transverse sectional view substantially along the dotted line 4—4 of Fig. 2 looking in the direction indicated by the arrows; Fig. 5 is a detail sectional view substantially along the line 5—5 of Fig. 4, looking in the direction indicated by the arrows; Fig. 6 is a sectional view substantially along the irregular line 6—6 of Fig. 4, Figs. 2 to 6 showing the slides of the carriage operated by the usual or standard mechanism of the cross slide carriage; Fig. 7 is a partial plan view; and Fig. 8 is a view partly in section and partly in elevation showing a modification wherein the slides are moved by the turret, which in turn is moved by the standard turret operating mechanism.

Referring now to the drawings, 10 represents a lathe bed adapted to accommodate a cross slide carriage which when the machine is designed solely or for permanent use in turning and facing blanks such as bevel gear blanks, will be preferably in the form shown at 11 in Fig. 1, and will comprise a casting which extends across the bed and engages the front and rear ways 12 of the bed and an apron 11ª which is bolted thereto. Generally, however, my invention is applied as an attachment to a lathe which is adaptable for other purposes also. In that event, a standard carriage such as shown at 13 in Fig. 2 and other figures will be employed, this carriage then engaging the front upper way 12 of the bed and having an apron 47 bolted to the carriage and engaging the lower support 14 as is usually the case. To apply the attachment to a standard cross slide carriage the cross slide is removed and there is substituted for it a special base plate 15 which will have a dove-tail connection 15a with the standard carriage 13, precisely like the connection which the ordinary cross-slide has with the carriage, although the base plate has no movement on the carriage crosswise of the bed, but is fixed to the carriage generally by gib screws 16 (see Fig. 4) which is the usual way for adjusting or locking a cross slide.

When the invention is embodied in the form of an attachment utilized in connection with, and secured to the standard carriage as above stated, the base plate is not only supported by the carriage, but additionally it is provided at its rear end on its underside with a casting 17 which engages the rear way 12 of the bed, as shown in Fig. 2, the casting being here shown as provided with a supporting bracket or clamp 18 which engages under a shoulder of the way 12.

On the cross slide carriage 11 of Fig. 1, or on the base plate 15, when the invention is in the form of an attachment, shown in Fig. 2, I provide a plurality, in this instance, two, of swiveled slide supports 19 and 20, (see Fig. 3) each of which may be turned to any angular position and secured to the carriage 11 or base plate 15 by bolts 21 which extend through slots of the swiveled slide supports 19 and 20, which slots are of sufficient length to permit the required angular adjustment of the slides. The swiveled slide supports 19 and 20 may be swiveled on the carriage 11 or base plate 15 in any suitable manner as by providing on each slide support an annular boss 22 such as shown in Fig. 6, which fits into a suitable hole or bearing in the carriage or base.

The slide supports 19 and 20 are provided with tool slides 23 and 24 which are adapted to have a given rectilinear or straight line movement on their respective slide supports. Preferably each slide support and the associated slide have a dove-tailed connection indicated at 25 in Figs. 1, 2 and 4.

As before stated, my improved cross slide is designed for both turning and facing blanks, particularly bevel gear blanks, one of which I have shown at 26 in Figs. 1, 2 and 3, the blank being secured in any desired manner to the work spindle 27 which I have shown in Fig. 3, and which is the usual lathe spindle. In this instance the slide 23 carries roughing and finishing facing tools 28 and 29 and a chamfering tool 30. The tools 28 and 29 are adapted to face the surface 26a of the blank, and the tool 30 is adapted to chamfer the corner 26b of the blank. Additionally the slide 24 is provided with roughing and finishing turning tools 31 and 32 adapted to turn the surface 26c of the blank and a boring tool 33 to bore the inside surface 26d. The tools may be secured to the slides in any suitable manner.

Coming now to the mechanism for moving the tool slides 23 and 24, I employ for this purpose a main rack bar 34 which extends lengthwise of the carriage, or base plate, (see Fig. 3) or crosswise of the lathe bed of the machine. This rack bar is adapted to slide in an endwise direction through the base whether it consists of the carriage 11 of Fig. 1 or the base plate 15, and in one embodiment of the invention is designed to move with the standard cross slide screw which I have shown at 35, the screw having at its outer end the usual hand wheel 36. It is immaterial how the rack bar 34 is connected to the screw 35, but in this instance the rack bar is attached to a block 37 arranged between a pair of shoulders 38 and 39 on the screw, the shoulder 38 being usually the dial which indicates the position of the screw.

Taking up now the manner in which the rack bar 34 moves the slides 23 and 24 on the slide supports 19 and 20, it will be observed that the rack bar engages and is designed to rotate pinions 40, each secured to or forming a part of a short upright shaft 41 which is arranged co-axially of the swivel connection between the slide and its associated slide support and having a bearing in said slide support and each being provided at its upper end with a pinion 42. The two slides are provided each with a rack bar 43, and these rack bars engage the upper pinions 42. It will be seen, therefore, that when the main rack bar 34 is moved in an endwise direction, both slides will simultaneously be moved along the dove-tail ways of the associated slide supports irrespective of the angular adjustment which may have been given to the slide supports. By reference to Fig. 3 it will be seen that when the rack bar 34 is moved to the right as the same is viewed in this figure, the slide 23 is moved in a direction parallel to the surface 26a of the blank and the slide 24 is moved parallel to the surface 26c of the blank so that simultaneously facing and turning cuts will be taken on the two surfaces, and when the facing and turning cuts are completed, the chamfering and boring tools 30 and 33 come into action. Likewise it will be apparent that when the main rack bar 34 is moved to the left, the slides are retracted to the position as shown in Fig. 3.

It was previously stated that the cross slides of the carriage could be operated either by the standard mechanism of the cross slide carriage, or by the standard turret operating mechanism. The first mentioned method of operation is illustrated in Figs. 1 to 6, to which reference is now directed. By referring to these views it will be noted that I have shown the feed shaft 44, which in accordance with standard lathe practice carries a worm 45 (see Fig. 4 and Fig. 6) arranged between a pair of shoulders 46 of the carriage apron 47, the worm being splined to the shaft so as to turn therewith and slide along the same. This worm engages a worm wheel 48, best shown in Fig. 6, which worm wheel is mounted on and fixed to the hub of a spur gear 49 which meshes with a spur gear 50, mounted on a stationary shaft 51 which is carried by the apron. Formed integral with, or attached to the spur gear 50, as may be desired, is a clutch member 52, and this co-operates with a second clutch member 53 designed to be controlled by a hand lever 54 at the front of the apron. When the lever is swung upward there is a camming action produced by cam faces shown at 55 which causes the member 53 to move inward to engage the clutch member 52 by a heavy frictional grip so that it will rotate with it, as shown in Fig. 6. When the hand lever 54 is swung upward to cause the clutch to become engaged, a spring actuated plunger 56 carried by the lever slips into a bushing 57 carried by the apron (see Fig. 2). Extending into this bushing from the opposite direction is a spring actuated releasing pin 58, and this is adapted to be moved outwardly so as to force out or disengage the plunger 56 from the bushing so as to cause the clutch to be disengaged by the lowering of the lever 54 by gravity, resulting in the disengagement of the cam faces 55, this taking place when the tools carried by the two slides have completed their cutting. In this instance the pin 58 is moved to the left, as shown in Fig. 2, so as to force the spring plunger out of the bushing, by a vertically movable trip rod 59 which when depressed has a cam action on the end of the pin 58. The upper end of this trip rod 59 is adapted to be engaged by an adjustable collar 60 which is adjustably secured to a rod 61 which has its forward or outer end attached to the block 37, which as before stated, is moved by the cross slide feed screw 35 and with the main rack bar 34.

The clutch member 53, which as before stated, is designed to be engaged by the clutch member 52 is provided on its periphery with spur gear teeth 62 which engage a pinion 63 (see Fig. 6) which pinion is splined to and slidably mounted on the cross slide feed screw 35. In order that the rotation of the pinion 63 may be caused to give this screw an endwise movement, the carriage is provided with a stationary nut 64, held between a pair of shoulders 65 and 66 of the carriage.

It is to be understood that the cross slide feed screw 35 and the mechanism for transmitting movement from the feed shaft to the screw constitute the usual mechanism of a standard cross slide carriage used with lathes.

Likewise it will be understood that while I have shown the details of the cross slide carriage mechanism in illustrating that embodiment of the invention wherein the latter is in the form of an attachment to the cross slide carriage, this same mechanism is utilized in the embodiment of the invention shown in Fig. 1, the only difference being that in the case of the attachment the regular cross slide is removed and the base plate 15 substituted, in which event I obtain the equivalent of the carriage shown in Fig. 1, which as before stated, is designed to remain constantly on the lathe bed.

When it is desired to apply the attachment of Figs. 2 to 6, the regular cross slide of the carriage is removed by first removing the hand wheel 36 and dial 38, whereupon the cross slide can be slid outwards from the carriage. Then the supporting casting 17 is placed on the rear way 12 and the clamp 18 is adjusted, and then the attachment is slid into the place previously occupied by the regular cross slide and locked to the carriage by tightening the gib screws and fastened also to the supporting casting 17. Then to put the attachment into operative condition it is only necessary to slip the block 37 onto the feed screw, restore the dial 38 and handle 36, and fasten the outer ends of the main rack bar 34 and of the rod 61 to the block 37.

Then the attachment is moved up to proper position with respect to the work spindle, and it is locked into place, and when the tool slide supports have been properly positioned on the carriage or base plate and the tools have been properly set in the holders carried by the tool slides 23 and 24 and a blank has been loaded on the work spindle, the attachment is operated simply by moving the hand lever 54 to a nearly horizontal position which will cause the feed screw 35 to be rotated by the feed shaft 44 and so cause the main rack bar to be moved in an endwise direction, and the latter will impart to the tool slides their feeding movement. When all the tools have completed their cutting, the movement of the tool slides is automatically stopped by the stop collar 60 which disengages the clutch, this stop member having been previously set to the desired position. The tool slides are preferably retracted by manually turning the hand wheel 36 which causes the rack bar to be moved endwise in the reverse direction. The finished blank is now removed from the work spindle and the machine is then ready for the next blank, for which the operations above described are repeated.

In the use of this attachment it is generally unnecessary to move the cross slide carriage lengthwise of the bed. Only in the event that blanks are being machined which require an unusual amount of loading space is it necessary to move the cross slide carriage away from the work spindle, but in that event it is only necessary to move it a few inches to provide the necessary space for loading the latter, and then the cross slide carriage is again moved up to its loading position. When the conditions require that the carriage and attachment be moved lengthwise of the bed, this is preferably done by the usual carriage moving hand wheel 67 on shaft 68, having as usual a pinion 69 which meshes with a gear 70 on a shaft 71 provided with a pinion 72 which engages a rack bar 73 bolted to the lathe bed under the front way. It is to be understood that this carriage moving mechanism is the standard mechanism of a lathe. When the carriage and attachment have been positioned properly with respect to the blank on the work spindle, the carriage is clamped to the lathe bed against longitudinal movement thereof, and for this purpose I may use a clamping lever 74, shown in Figs. 4 and 5, which lever when turned in one direction shifts a clamping bar 75 which solidly clamps the carriage to the front way. Unless it is necessary to move the carriage lengthwise of the bed, this lever 74 need not be disturbed when a series of blanks are being machined. In that event the carriage remains continuously clamped to the front way 12 of the lathe bed by the clamp 75, and at the same time the supporting casting 17 can be clamped by the clamping member 18 to the rear way of the lathe bed to securely lock the carriage to the lathe bed to prevent endwise movement. On the other hand, when conditions make it necessary or advisable that the carriage be moved away from the work spindle to provide more room for loading purposes, and then be moved up to operative position, I may employ an adjustable stop clamped to a part of the lathe bed with an adjustable member against which the carriage may be positioned or engaged when the carriage has been moved up to its working position after the work spindle has been loaded and just before the carriage is clamped in place.

I have previously stated that the two tool slides of the carriage instead of being moved by the mechanism of the cross slide carriage may be moved by the turret, and that embodiment of the invention is shown in Figs. 7 and 8. In these views, 76 represents conventionally the turret of a turret lathe, which turret is mounted upon a saddle 77 which is slidably mounted on the ways 12 of the lathe bed in the customary manner. It is to be understood that the usual mechanism will be provided for moving the turret saddle, and that the usual trip mechanism will be provided also to stop the movement of the saddle at a predetermined point. These parts or mechanism I have not shown, as they constitute standard parts of a turret lathe.

The attachment operated by the turret is constructed precisely like that first described, except as regards the mechanism for shifting in an endwise direction the main rack bar 34, and therefore in Figs. 7 and 8 I have not endeavored to show all the parts of the attachment, as such showing would be a mere repetition of what is shown in the preceding figures.

For the purpose of moving the main rack bar 34 in an endwise direction to move the tool slides carrying the facing and turning tools, I secure to one face of the turret 76 a rigid bracket 78 which extends down to, or slightly below the level of the ways 12 of the lathe bed. To the lower end of this bracket I securely fasten by set screws 79 or otherwise, a rack bar 80 which extends lengthwise of the lathe bed between the ways 12. This rack bar extends through an opening in the lower central part of the base plate which is here designated 15$^a$, this opening affording a bearing 81 for the rack bar 80 as clearly shown in Fig. 8. The opening which receives the rack bar 80 may be formed in an integral portion of the base plate, or in a part bolted to it, as for example, it may be formed in a part of the supporting casting 17 shown in Fig. 2. In Fig. 8 the opening which receives the rack bar is formed in a member 82 bolted to the under side of the base plate.

For the purpose of causing the movement of the rack bar 80 to be transmitted to the main rack bar 34, which as already explained, moves crosswise of the lathe bed, through the base plate, I mount in the base plate, or in the member 82, in case a separate member is employed as shown in Fig. 8, a short vertical shaft 83 provided at its lower end with a pinion 84 which engages the rack bar 80 (this pinion being shown by dotted lines in Fig. 8), and the shaft is provided at its upper end with a pinion 85 which engages the main rack bar 34, this last mentioned pinion being shown in both Figs. 7 and 8.

Thus with this construction, assuming that the attachment has been mounted on the standard carriage in the manner already explained, and the latter has been fixed to the lathe bed to cause the slides to be moved so that the tools will perform their turning and facing functions, the turret saddle 77 is moved forwardly by throwing in the power feed, and when all the tools have completed their cutting, the automatic tripping device which is previously set stops the movement of the turret and then the turret is moved back by throwing in the automatic quick return mechanism with which most turret lathes are provided. When the slides have been retracted a proper distance by the backward movement of the saddle the movement of the turret will be stopped either automatically or manually.

It will be seen therefrom from the foregoing description that I have provided an improved cross slide carriage and a turning and facing attachment involving the use of compounded tool slides simultaneously operated by one operating member to simultaneously perform turning and facing functions on surfaces of a blank having any relation to one another. Likewise it will be seen that the objects stated at the beginning of the specification are very effectively attained by my invention.

While I have shown certain embodiments of my invention, I do not desire to be confined to the exact details or precise arrangements shown, but aim to cover all modifications which do not involve a departure from the spirit and scope of my invention as defined in the appended claims.

Having described my invention, I claim:

1. In a machine tool, a bed, front and rear tool slides for supporting cutting tools adapted for simultaneous operation on the same work-piece, a common supporting member on the bed for said slides, and means for simultaneously operating the slides comprising a rotary member, and a common sliding member on said supporting member between the rotary member and the slides.

2. In a machine tool, a bed, front and rear tool slides adapted to be provided with cutting tools, a common support on the bed for said slides, and means for simultaneously moving the slides comprising a common sliding member on said support and rotary means between said member and the slides.

3. In a machine tool, a bed, a cross slide carriage having front and rear tool slides, and a common sliding member supported by said carriage and rotary means between said member and the slides for simultaneously moving the slides.

4. In a machine tool, a bed, front and rear tool slides adapted to be provided with tools for simultaneous work on a blank, means comprising an endwise movable rack bar and pinions operated thereby for simultaneously moving said slides.

5. In a machine tool, a pair of tool slides adapted to be provided with tools for simultaneous operation on a blank, swivel supports for said slides, and a common sliding member for simultaneously operating the slides.

6. In a machine tool, a pair of tool slides adapted to be provided with tools for simultaneous operation on a blank, swivel supports for said slides, and a rack bar for simultaneously moving the slides on their supports.

7. In a machine tool, a plurality of tool slides adapted to be provided with tools for simultaneously operating on a blank, swivel supports for said slides, a common support on which said swivel supports are mounted and to which the latter are adapted to be secured after adjustment, and a common sliding member for moving the slides on the swivel supports.

8. In a machine tool, a plurality of tool slides adapted to be provided with tools for simultaneously operating on a blank, swivel supports for said slides, a common support on which said swivel supports are mounted and to which the latter are adapted to be secured after adjustment, and a rack bar for simultaneously moving said slides on their supports.

9. In a machine tool, a cross slide carriage having a plurality of swivel supports adjustably mounted thereon, a tool slide mounted for movement on each swivel support, and a common sliding member on said carriage for simultaneously shifting the slides on the swivel supports.

10. An attachment for a cross slide carriage comprising a supporting member adapted to be secured to the carriage, swivels carried by said member and arranged for angular adjustment thereon, tool slides mounted on said swivels, and a common sliding member for actuating the same.

11. An attachment for a cross slide carriage comprising a supporting member adapted to be secured to the carriage, swivels carried by said member and arranged for angular adjustment thereon, tool slides mounted on said swivels, and an endwise movable rack bar for simultaneously shifting the slides on the swivels.

12. In a machine tool, a bed having a cross slide carriage, an attachment therefor comprising a support adapted to be applied to the carriage, a plurality of tool slides mounted on said support, and a common sliding member for simultaneously shifting the slides independently.

13. In a machine tool, a bed having a cross slide carriage, an attachment therefor comprising a support adapted to be applied to the carriage, a plurality of tool slides mounted on said support, a common member for simultaneously shifting the slides, and means whereby said member may be moved by a power operated part of the machine tool.

14. In a machine tool, a bed having a cross slide carriage, an attachment therefor comprising a slide supporting member adapted to be secured to the carriage, swivels carried by said member and adapted to be angularly adjusted thereon, slides carried by the swivels, and a common member for simultaneously moving the slides.

15. In a machine tool, a bed having a cross slide carriage, an attachment therefor comprising a slide supporting member adapted to be secured to the carriage, swivels carried by said member and adapted to be angularly adjusted thereon, slides carried by the swivels, a common member for simultaneously moving the slides, and means whereby said common member may be moved by a power operated part of the machine tool.

16. A turning and facing attachment for a cross slide carriage of a machine tool comprising a base member carrying a plurality of slides, each having a rack, a common endwise movable operating rack, and pinion devices for connecting said common operating rack to the racks of the slides.

17. A turning and facing attachment for the cross slide carriage of a machine tool comprising a base member adapted to be secured to the carriage, swivels mounted on the base member and adapted to be adjusted angularly thereon, slides mounted on the swivels, racks carried by the slides, a common operating rack carried by the base member, and pinion devices co-axial with the axes of the swivels, and serving to operatively connect the common operating rack of the base member with the racks of the slides.

18. In a lathe the combination of the lathe spindle, means for securing the work thereto for rotation therewith, a saddle mounted upon the lathe, a longitudinally movable tool support mounted on said saddle, a transversely movable tool support mounted on said saddle, a feed bar carried by said saddle adapted to engage said tool supports simultaneously to cause said first named tool support to move longitudinally and said second named tool support to move transversely of the axis of said lathe, and actuating means carried by said saddle adapted when operated to move said feed bar to engage and move said tool supports.

19. In a lathe the combination of the lathe spindle, means for securing the work thereto for rotation therewith, a saddle mounted upon the lathe, a longitudinally movable tool support mounted on said saddle, a transversely movable tool support mounted on said saddle, a feed bar carried by said saddle adapted to engage said tool supports simultaneously to cause said first named tool support to move longitudinally and said second named tool support to move transversely of the axis of said lathe, actuating means carried by said saddle adapted when operated to move said feed bar to engage and move said tool supports and means for retracting said feed bar.

20. In a lathe, the combination of a lathe spindle, means for securing the work thereto for rotation therewith, a saddle mounted upon the lathe, a longitudinally movable tool support mounted on the saddle, a transversely movable tool support mounted on the saddle, a feed bar carried by the saddle and supported thereby independently of both tool supports, and operatively connected to said tool supports so that when actuated it will move both tool supports simultaneously, and actuating means carried by the saddle adapted when operated to move said feed bar.

21. In a lathe, the combination of the lathe spindle, means for securing the work thereto for rotation therewith, a saddle mounted upon the lathe, a longitudinally movable tool support mounted on the saddle, a transversely movable tool support mounted on the saddle, a transversely movable feed bar carried by and supported by the saddle independently of the tool supports, movement transmitting means between said feed bar and both tool supports and serving to simultaneously transmit movement from the feed bar to both tool supports, and actuating means carried by the saddle and adapted when operated to move said feed bar and thereby cause it to move both tool supports.

In testimony whereof, I hereunto affix my signature.

WILLIAM J. BURGER.